(12) United States Patent
Li et al.

(10) Patent No.: US 7,057,719 B2
(45) Date of Patent: Jun. 6, 2006

(54) SYSTEM AND METHOD FOR HARD DISC DRIVE MAGNETIC HEAD FLYING HEIGHT TESTER CALIBRATION

(75) Inventors: Yu Li, Dongguan (CN); Yuanzhan Hu, Dongguan (CN)

(73) Assignee: SAE Magnetics (H.K.) Ltd., Shatin (HK)

( * ) Notice: Subject to any disclaimer, the term of this patent is extended or adjusted under 35 U.S.C. 154(b) by 353 days.

(21) Appl. No.: 10/649,104

(22) Filed: Aug. 26, 2003

(65) Prior Publication Data

US 2004/0085547 A1     May 6, 2004

(30) Foreign Application Priority Data

Nov. 4, 2002   (CN)   .................. PCT/CN02/00779

(51) Int. Cl.
 *G01J 1/10*   (2006.01)
 *G01B 11/02*  (2006.01)
(52) U.S. Cl. .................... 356/243.3; 356/507
(58) Field of Classification Search ............ 356/243.3, 356/507
See application file for complete search history.

(56) References Cited

U.S. PATENT DOCUMENTS

| | | | | | |
|---|---|---|---|---|---|
| 4,624,564 | A | * | 11/1986 | Dahlgren ................ | 356/243.3 |
| 5,410,402 | A | * | 4/1995 | Li et al. .................... | 356/507 |
| 5,453,831 | A | * | 9/1995 | Li et al. .................... | 356/507 |
| 5,552,884 | A | * | 9/1996 | Li et al. .................... | 356/507 |
| 5,710,632 | A | * | 1/1998 | Li .............................. | 356/507 |
| 5,724,134 | A | * | 3/1998 | de Groot et al. ......... | 356/243.1 |
| 5,767,964 | A | * | 6/1998 | Wahl et al. ................ | 356/507 |
| 5,808,736 | A | * | 9/1998 | Womack et al. ........... | 356/507 |
| 2002/0018214 | A1 | * | 2/2002 | Liu et al. ................... | 356/507 |
| 2004/0085547 | A1 | * | 5/2004 | Li et al. .................... | 356/507 |
| 2004/0141186 | A1 | * | 7/2004 | Hu et al. ................... | 356/507 |

* cited by examiner

*Primary Examiner*—Gregory J. Toatley, Jr.
*Assistant Examiner*—Patrick Connolly
(74) *Attorney, Agent, or Firm*—Kenyon & Kenyon LLP (57) ABSTRACT

A system and method are disclosed for calibrating a hard disc drive magnetic head flying height tester by a calibration standard, which includes a mock slider and mock disc, by optical interference techniques.

32 Claims, 6 Drawing Sheets

SYSTEM AND METHOD FOR HARD DISC DRIVE MAGNETIC HEAD FLYING HEIGHT TESTER CALIBRATION

BACKGROUND INFORMATION

The present invention relates to optical gap measuring tool calibration. More specifically, the invention relates to a system for calibrating a hard disc drive magnetic head flying height tester by optical interference techniques.

Figure 1:
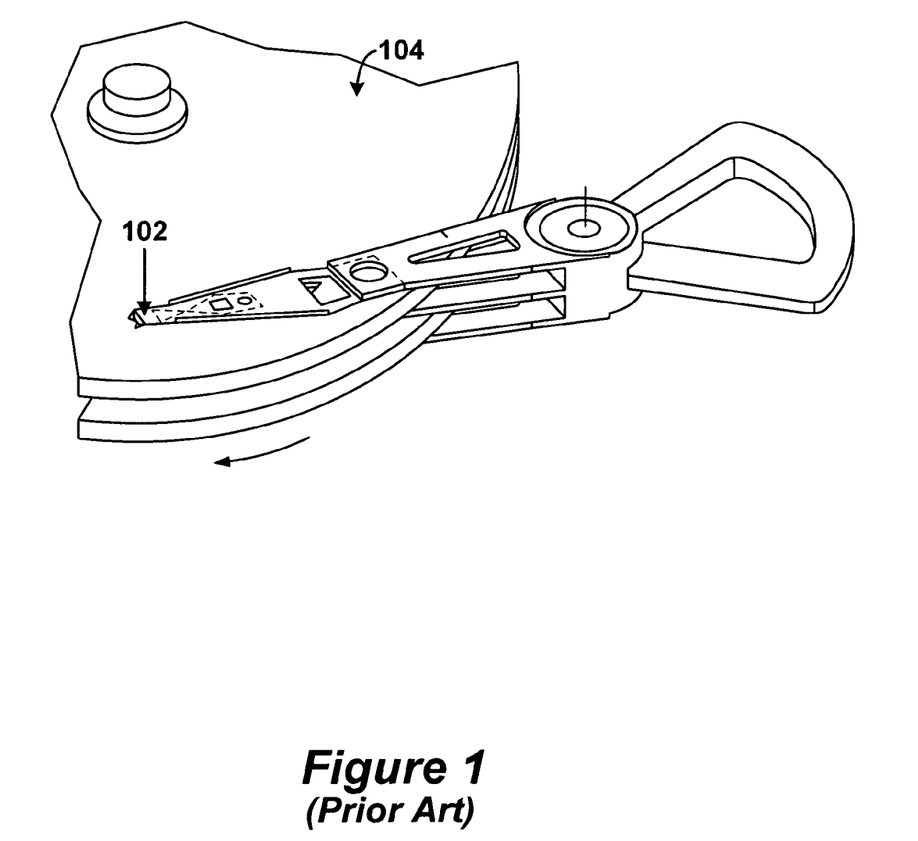
FIG. 1 provides an illustration of a typical hard disc drive.

FIG. 1 provides an illustration of a typical hard disc drive. In the art of hard disc drives, magnetic read/write heads 102 are commonly integrated in a slider 102 designed to respond to a flow of air moving with the rotating disc 104 over which the slider 102 travels. The head/slider 102 'flies' close to the surface of the disc 104. In manufacturing such heads/sliders 102, it is often necessary to test hydrodynamic characteristics of the heads 102 to verify their performance. It is important that the head 102 not travel too far from or close to the disc 104 surface. Further, it is important to prevent the head 102 from traveling at an improper angle with respect to the disc surface 104. A head 102 traveling too high above the disc surface 104 will result in a lower than desired areal density. A head 102 traveling too low can cause an interface failure between the head 102 and disc 104.

In order to test the flying height of the head, a flying height tester is commonly used. Optical interference techniques are employed to determine the distance between head and disc. A monochromatic light source is directed at a transparent surrogate disc, such as a glass disc, rotating at speeds similar to that of a magnetic disc, and the head assembly being tested is secured in a holder in its normal flying orientation in relation to the disc. The monochromatic light is directed at the disc at a predetermined angle to the surface thereof. The light is reflected from the surface of the disc closest to the head, as well as from the surface of the flying head itself, and impinges onto a light sensitive sensor.

The interference effects created by the combined reflections from the disc and the slider surface provide the flying height information. A computer receives data from the flying height tester and calculates the perceived flying height and angle of the head. As hard drives become smaller and increase in data storage capacity, the desired head flying height continually reduces. Therefore, the accuracy of a flying height tester, and thus its calibration, are of critical concern.

In the art, calibration of flying height testers has been accomplished through the use of a standard head whose characteristics are known. However, after repeated use, the reflective surface and flying characteristics of the head are altered by dust, oil and other foreign matter. These contaminants can alter the standard for calibration purposes. The calibration of flying height testers is also performed by a standard comprising a substrate having a reflective layer deposited thereon to represent the head and a transparent layer having a predetermined thickness deposited on the reflective layer. The standard is placed in the flying height tester with the transparent layer spaced from the disc and monochromatic light directed at the standard. A disadvantage of such a standard is that it uses a transparent material rather than air between the disc and the reflective layer. In addition, such a standard does not provide for the accurate determination of position along the length of the standard.

Figure 2A:
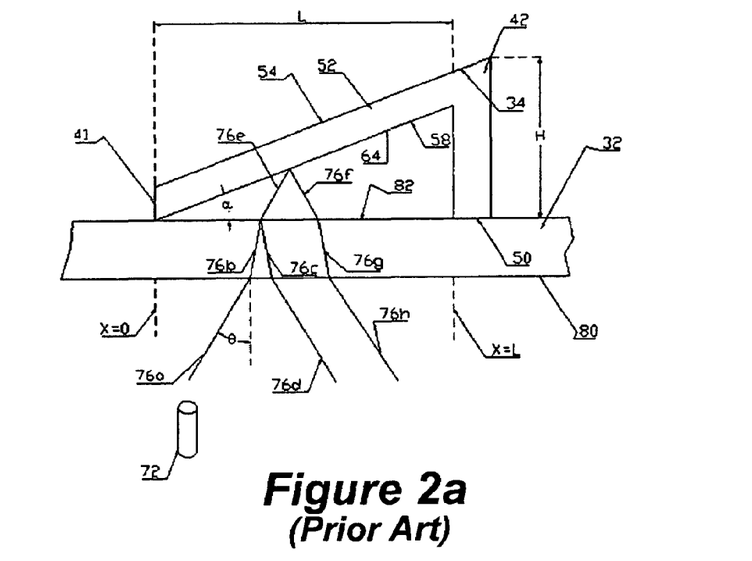
FIGS. 2a–b illustrate another flying height tester (optical gap measuring tool) calibration standard known in the art.
Figure 2B:
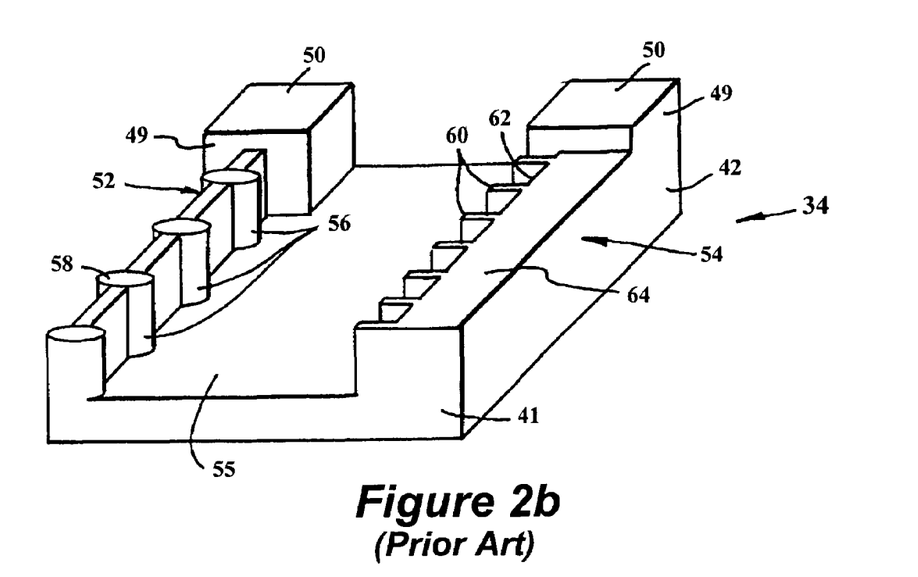

FIGS. 2a–b illustrate another flying height tester (optical gap measuring tool) calibration standard known in the art and described in U.S. Pat. No. 5,453,831 to Li et al. A wedge slider 34 is held in contact with a transparent disc 32. One end 42 of the wedge slider is raised, creating an optical wedge between the wedge slider 34 and the disc 32. The wedge slider 34 has a first rail 52 and a second rail 54, each of which extends along the length of the wedge slider 34 and has a surface 55 facing the disc 32. The first rail 52 has a plurality of cylindrical portions 56 therein at regularly spaced intervals. Each cylindrical portion 56 has a diameter equal to the diameter of the beam spot from the light source 72 of the flying height tester, thus allowing the beam spot to be matched at the position of any given cylindrical portion 56. The second rail 54 has a width that is greater than the diameter of the beam spot, thereby allowing for a continuous optical wedge measurement along its length. The second rail 54 may also have a plurality of marks on one side, which can be used to determine the position along the length of the wedge slider at which a measurement is taken.

To calibrate the flying height tester, the distance between the wedge slider 34 and the disc 32 is measured at multiple locations along its length and compared with known, or expected, values of the flying height at those locations. The flying height is measured at multiple locations by optical interference techniques. The expected value of the flying height at each position along the length of the wedge slider is calculated using the known dimensions of the wedge slider. The calculation is corrected for any surface irregularities found during a mapping of the surface of the first and second rails.

One disadvantage of a flying height tester calibration standard such as this is the complexity of design. Manufacturing such a device at such a small scale is very difficult and expensive. Further, the likelihood of form and material irregularities increases with complexity of design. Still further, the determination of the exact lateral position of the measurement is a problem, which is only partially resolved by the incorporation of the cylindrical portions 56 in the design described in FIG. 2b (causing increased design complexity).

Yet another disadvantage of this design is the effect of phase change upon reflection. This difficulty is described in an article entitled "Interferometric Measurement of Disk/Slider Spacing: The Effect of Phase Shift on Reflection" by C. Lacey, T. Shelor, A. J. Cormier, and R. E. Talke. This article provides that the optical properties of slider materials can introduce errors as large as 20 nanometers (nm) in flying height sensors. These same problems apply to calibration standards. To compensate for such potential errors, the calibration standard must itself be carefully set up for phase change on reflection, using ellipsometric techniques. For example, U.S. Pat. No. 5,453,831 recommends fabricating a separate block of the same material as that of the wedge slider calibration standard. This piece of material is assumed to have the same optical properties as the wedge slider and may be used to determine the phase change on reflection using an ellipsometer or like optical instrument. This separate step complicates the current process further, as well as introducing uncertainties into the calibration.

Figure 3:
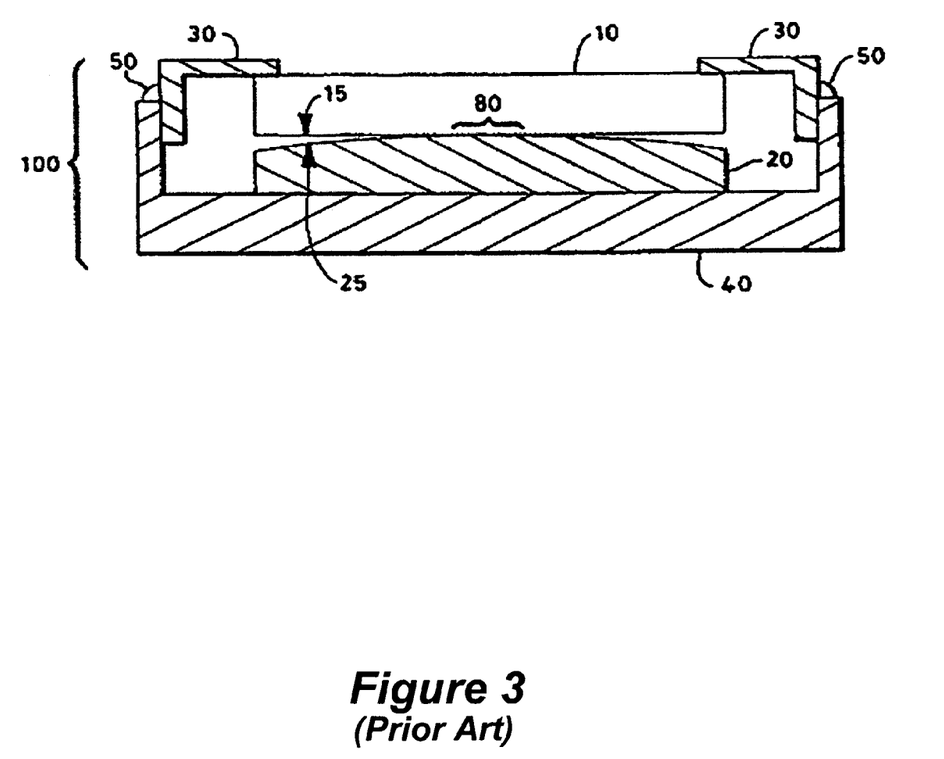
FIG. 3 illustrates another calibration standard known in the art.

FIG. 3 illustrates another calibration standard known in the art and described in U.S. Pat. No. 5,724,134 to de Groot et al. As shown in FIG. 3, the apparatus is comprised principally of two elements 10,20. One or both of the elements is fabricated from a substantially transparent material such as glass or the like, thus permitting access to the gap for optical inspection. One of the surfaces of the first of these elements is substantially flat or planar 15, and one of the surfaces of the second element is non-planar or curved 25. The curved surface 25 is preferably convex spherical in form. The two principle elements of the apparatus of the present invention are held together in such a way that the curved surface of the second element is substantially in contact with the flat surface of the first element. Since a curved surface and a flat surface cannot be entirely in contact over the entire area of either one of the two surfaces, the region of contact 80 is typically substantially smaller in area than either of the two surfaces. Outside the region of contact 80, the gap between the surfaces varies according to the known geometric curvature of the surface on the second element.

One problem with this design involves the measurement uncertainty within the contact area (zeroed region). Between the first element 10 and second element 20 there is a contact area 80 of at least 3 millimeters (mm). This is due to physical deformation towards the center of the curved surface (caused by the pressing of the first element 10 to the second element 20). The broad region of contact makes it difficult to resolve accurate height information with respect to measurement location for calibration. The amount of physical deformation affects the resulting calibration data.

Figure 4A:
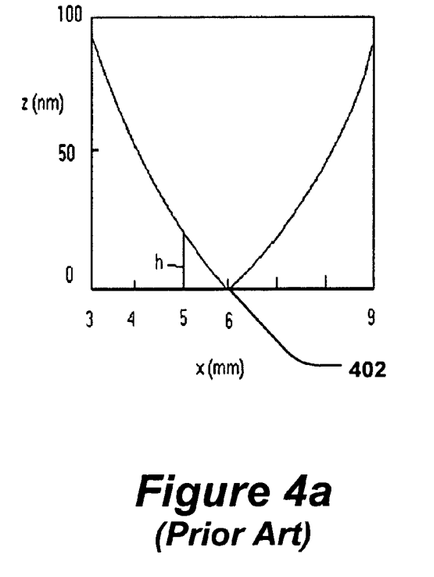
FIGS. 4a–b illustrate an example of the adverse effects of surface deformation occurring in a calibration standard.
Figure 4B:
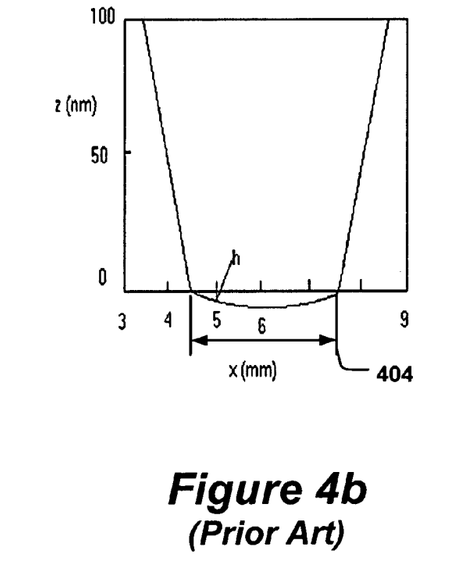

FIGS. 4a–b illustrate an example of the adverse effects of surface deformation occurring in a calibration standard such as is described in the '134 patent. As shown in FIG. 4a, with minimal pressure and slight deformation, the calibration standard provides a zeroed reading at the center of the curved surface (z=0 nanometers(nm) at x=6 millimeters (mm)) 402. By comparison, with greater deformation of the center surface, it is more difficult to resolve the contact location. The chart actually shows a negative height value between 4.5 and 7.5 (See reference 404). Once the first element 10 is affixed to the second element 20 (typically by adhesive), the deformation is fixed as well. With this deformation when measuring such small gaps, it is very difficult to determine where the contact point is.

It is therefore desirable to have a system for calibrating flying height testers that avoids the above-mentioned problems, as well as having additional benefits.

DETAILED DESCRIPTION

Figures 5A, 5B:
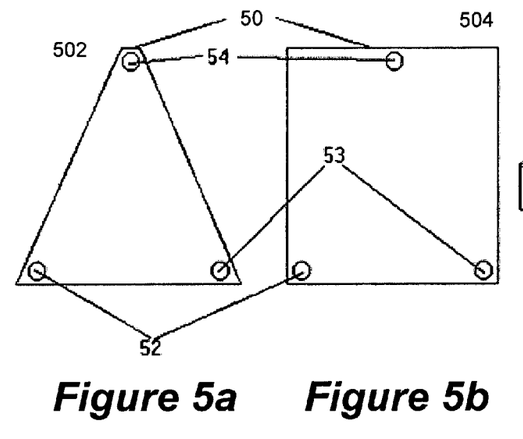
FIG. 5 illustrates a flying height tester calibration standard according to an embodiment of the present invention.
Figure 5C:
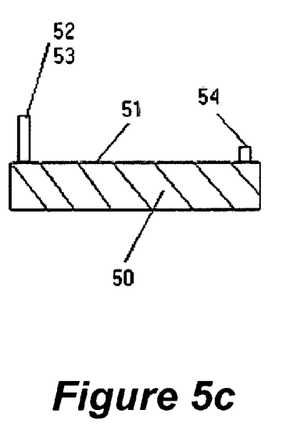
Figure 5D:
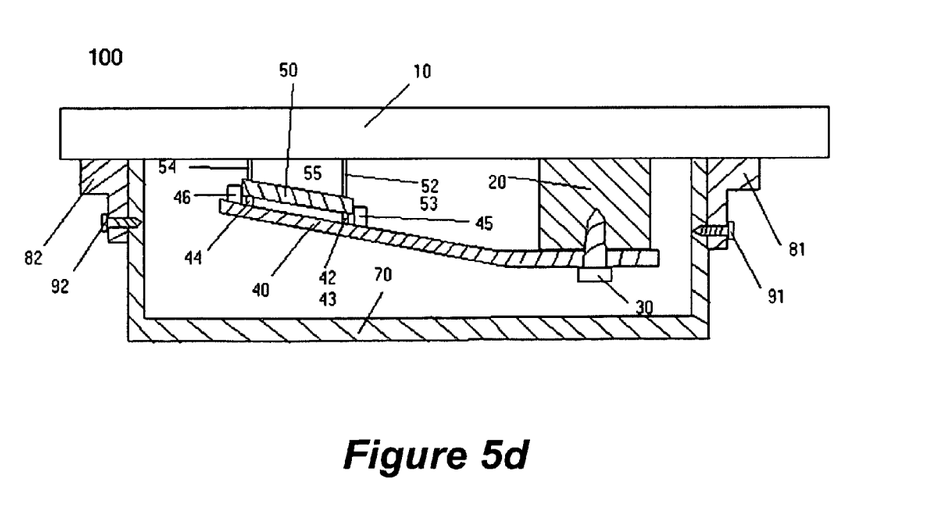

FIG. 5 illustrates a flying height tester calibration standard according to an embodiment of the present invention. As illustrated in FIG. 5d, in this embodiment, a wedge-shaped air space 55 is provided by a tilted mock slider 50, having three bumps (bracing beams) 52,53,54, each made of a material such as Pattern Diamond-Like Carbon (PDLC). The bracing beams 52,53,54 are in contact with a substantially smooth, transparent mock disc 10. In one embodiment, the mock disc 10 is actually disc-shaped. The mock disc 10 may be a transparent material such as glass. In one embodiment, a suspension arm 40 is utilized to ensure the beams 52,53,54 maintain contact with the mock disc 10.

As illustrated in FIG. 5b, in one embodiment, the mock slider 50 is rectangular 504. As illustrated in FIG. 5a, in an alternative embodiment, the mock slider is triangular 502. The mock slider may be a head substrate. In one embodiment, a mock recording head (not shown) may be applied to the mock slider 50 by thin film chemical deposition.

As shown in FIG. 5c, in one embodiment, the heights (actual heights) of the three beams 52,53,54 are different. In one embodiment, two 52,53 of the three beams have substantially the same height. Their lengths may be measured by a tool such as an Atomic Force Microscope (AFM). Knowing the actual lengths of each of the three beams 52,53,54 makes it possible to find the distance (actual height) between the mock slider 50 and mock disc 10 at any point (explained below). The mock slider 50 contacting the disc 10 via the beams 52,53,54 prevents the zeroing problem (deformation) described above.

In one embodiment, a flying height tester (not shown) is calibrated by first inserting the standard 100 into the tester. The distance (measured distance) between the mock slider 50 and the mock disc 10 is measured at multiple locations along the mock slider's 50 length and compared with known or expected values of the flying height (actual distance) at those locations. The measured height (measured distance) may be measured by known optical interference techniques. As further explained below, the actual distances at each location along the length of the mock slider 50 may be calculated using the actual lengths of the beams 52,53,54. In one embodiment, this calculation may then be corrected for any surface irregularities found during a mapping of the surface of the bar/slider by a tool such as a profilometer. The acquired surface irregularity information may used by a computer to provide a correction function or a series of correction factors.

As shown in FIG. 5d, in one embodiment, the interior of the calibration standard 100 is protected from contaminants by an enclosure 70. In one embodiment, the enclosure 70 is secured to fixtures 81,82 by attaching means such as screws 91,92. In this embodiment, the fixtures 81,82 are secured to the mock disc by a material such as an adhesive. In one embodiment, the mock slider 50 contacts the mock disc 10 via the beams 52,53,54. The mock slider 50 is held to the mock disc 10 by the spring force (pre-loaded bend) of the suspension arm 40 (amount of force necessary to maintain contact).

As illustrated in FIG. 5d, in one embodiment, three support bumps 42,43,44 of substantially the same height are located on the suspension arm 40. In this embodiment, each support bump 42,43,44 is located directly below a respective bracing beam 52,53,54 on the mock slider 50. In one embodiment, the suspension arm 40 has two locating pins 45,46, which are utilized to maintain the mock slider's 50 position upon the suspension arm 40. In one embodiment, the locating pins 45,46 are shorter (come to a point lower) than the surface of the mock slider 50 upon the support bumps 42,43,44.

FIG. 6 illustrates the calibration of a flying height tester with a calibration standard according to an embodiment of the present invention. The difference in height of the beams 52,53,54 causes an angle 'a' between the mock slider surface 51 and the mock disc surface 12. The horizontal position along the length of the mock slider 50 is described by the variable 'y' from y=0 to y=L (x, y, and z-axis illustrated in FIG. 6c). The vertical distance (or flying height) between the mock disc surface 12 and the mock slider 50 is described by the variable 'h'. The flying height h varies with y from 'h1' at y=0 to 'h2' at y=L.

Figure 6A:
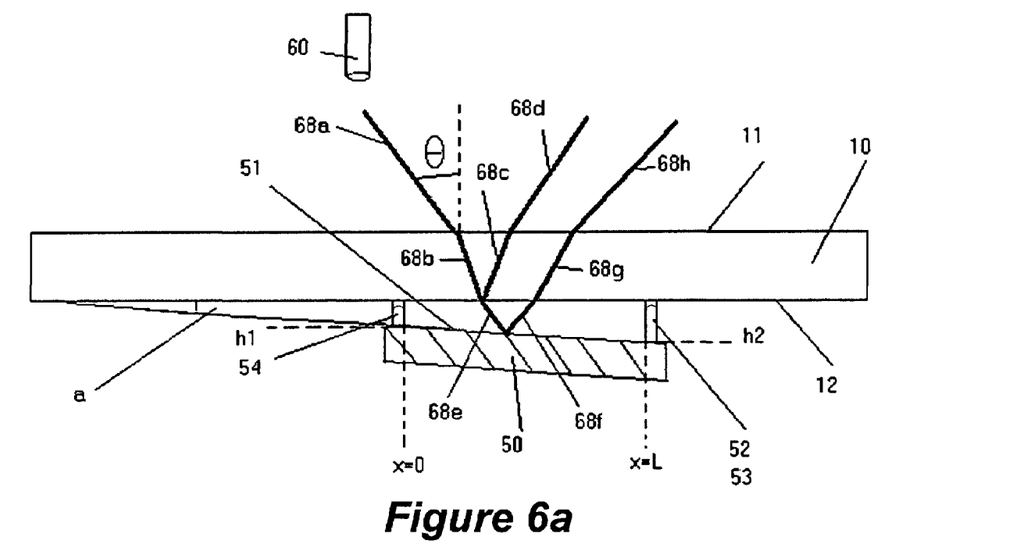
FIG. 6 illustrates the calibration of a flying height tester with a calibration standard according to an embodiment of the present invention.
Figure 6B:
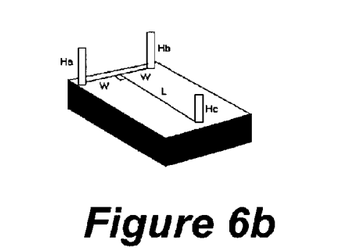
Figure 6C:
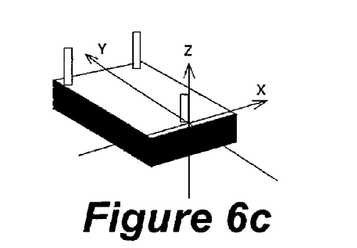

In one embodiment of the present invention, as illustrated in FIG. 6a, to calibrate a flying height tester, the calibration standard 100 is placed in the flying height tester in place of the glass disc (not shown) of the tester under the tester's light source 60. In calibrating the flying height tester, height measurements are taken by the tester ('measured distance') at multiple points along the mock slider's length (y-axis). The measured distances are compared with the known (or expected) values ('actual distances') at those locations. In one embodiment, a linear translator and computer (not shown) are utilized to position the standard 100.

In this embodiment, at each measurement point, monochromatic light 68a is directed at the (transparent) mock disc 10 by the light source 60, as shown in FIG. 6a. The light 68a impinges the disc 10 at an angle θ incident to a first mock disc surface 11 and continues through the (glass) mock disc 10 along path 68b to a second mock disc surface 12, where it splits and is partially reflected. The reflected portion follows path 68c through the disc 10 to the first surface 11, and follows path 68d to a sensor of the flying height tester (not shown). The remaining light follows path 68e to the mock slider surface 51 where it is reflected to the mock disc 10 via path 68f. The light impinges the second surface 12 of the mock disc 10, follows path 68g through the disc 10 and follows path 68h to the tester sensor (not shown). The slight angular deviations between paths at the air/disc interface are due to the Snell effect. Both the height h1,h2 and the incident angle θ have been exaggerated in FIG. 6a for illustrative purposes. Path 68a is actually substantially normal to the mock disc surface 11 with typical flying height testers. In one embodiment of the present invention, the height Hd=h2−h1 is between 12 and 13 microinches and the length L is between 0.045 and 0.1 inches.

In one embodiment, utilizing the following solid geometry equation, $$\frac{H_a - H_b}{2W} X + \frac{2H_c - H_a - H_b}{2L} Y + Z - H_c = 0,$$

and setting Ha=Hb=H, $$Z = \frac{H - H_c}{L} Y + H_c,$$

is yielded. Further, in this embodiment, the angle α may be developed from $$\cos a = \frac{1}{\sqrt{\left(\frac{H_c - H}{L}\right)^2 + 1}}.$$

In one embodiment, the angle α is less than 0.01098°.

In this embodiment, the beams 52,53,54 are cylindrical, each beam having a diameter of 394 microinches (10 microns) and a hemispherical tip (contacting the mock disc 10) to minimize the surface contact area. As stated above, in one embodiment, the beams are a material such as Pattern Diamond Like Carbon (PDLC) and formed by a method such as deposition or ion milling, the height being controlled by deposition/milling time.

Figure 6D:
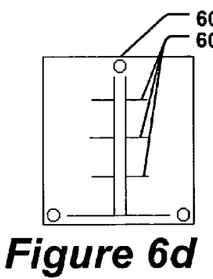
Figure 6E:
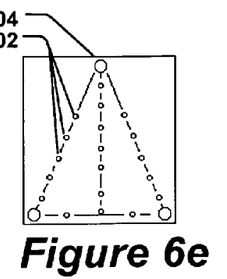

To overcome the problem with the prior art of design/manufacturing complexity, an embodiment of the present invention requires only a substantially flat, planar surface for the mock slider 50 (as compared to the complex design provided by the '831 patent). To overcome the zeroing problem of the prior art, an embodiment of the present invention avoids having contact between the mock slider 50 and the mock disc 10 (by using bracing beams 52,53,54). To overcome the difficulty of measurement location identification in the prior art, in one embodiment, measurement scale markings 602 are provided on the surface of the mock slider 604 facing the mock disc (not shown), as illustrated in FIGS. 6d and 6e.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method for calibrating a gap measuring tool comprising:
    providing a calibration standard including a mock disc and a mock slider with a plurality of bracing beams, each of said beams having a known respective length and said plurality of beams separating and maintaining a space between said slider and said disc;
    determining an actual distance between said slider and said disc at a plurality of locations based on the known respective lengths of the beams;
    determining an observed distance between said slider and said disc at one or more of said locations; and
    comparing said observed distance to said actual distance at each of said locations.

2. The method of claim 1, wherein said space between said slider and said disc is a 'wedge'-shaped space.

3. The method of claim 1, wherein said gap measuring tool is a hard disc drive head flying height tester.

4. The method of claim 1, further comprising:
    adjusting said gap measuring tool based on said comparing said observed distance to said actual distance.

5. The method of claim 1, further comprising:
    determining a differential between said observed distance and said actual distance; and
    adjusting said gap measuring tool based on said differential.

6. The method of claim 1, further comprising:
    providing a suspension arm to secure the slider to the disc and to maintain the slider's position with respect to the disc.

7. The method of claim 6, wherein said suspension arm includes a number of locating pins capable of accepting and maintaining said slider in a proper orientation with respect to said disc, said disc being pressed against said disc by said suspension arm.

8. The method of claim 6, wherein said slider and said suspension arm are generally enclosed within said calibration standard.

9. The method of claim 1, wherein said bracing beams are Pattern Diamond-Like Carbon (PDLC).

10. The method of claim 1, wherein said mock slider is a magnetic head/slider substrate.

11. The method of claim 10, wherein said slider includes a film of overcoat.

12. The method of claim 1, wherein said mock disc is an optically transparent disc.

13. The method of claim 12, wherein said disc is glass.

14. The method of claim 1, wherein said determining said observed distance between said slider and said disc is performed by optical interference techniques.

15. The method of claim 14, further comprising:
providing one or more measurement scale markings upon a surface of said slider facing said disc, each of said markings associated to a respective actual distance from said disc.

16. The method of claim 15, wherein said comparing said observed distance to said actual distance includes comparing the actual distance associated to a scale marking to an observed distance at that location.

17. A system for calibrating a gap measuring tool comprising:
a calibration standard including a mock disc and a mock slider, said mock slider including a plurality of bracing beams, wherein
each of said beams is of a known respective length, said respective length for determining an actual distance between said slider and said disc at a plurality of locations;
said plurality of beams is to separate and maintain a space between said slider and said disc; and
said calibration standard is for determining an observed distance between said slider and said disc at one or more of said locations for a comparison between said observed distance and said actual distance at each of said locations.

18. The system of claim 17, wherein said space between said slider and said disc is a 'wedge'-shaped space.

19. The system of claim 17, wherein said gap measuring tool is a hard disc drive head flying height tester.

20. The system of claim 17, wherein said gap measuring tool is to be adjusted based on said comparison between said observed distance and said actual distance.

21. The system of claim 17, wherein a differential between said observed distance and said actual distance is to be used for adjusting said gap measuring tool.

22. The system of claim 17, wherein a suspension arm is to secure the slider to the disc and is used to maintain the slider's position with respect to the disc.

23. The system of claim 22, wherein said suspension arm includes a number of locating pins capable of accepting and maintaining said slider in a proper orientation with respect to said disc, said disc being pressed against said disc by said suspension arm.

24. The system of claim 22, wherein said slider and said suspension arm are generally enclosed within said calibration standard.

25. The system of claim 17, wherein said bracing beams are Pattern Diamond-Like Carbon (PDLC).

26. The system of claim 17, wherein said mock slider is a wedge slider.

27. The system of claim 26, wherein said slider includes a film of overcoat.

28. The system of claim 17, wherein said mock disc is an optically transparent disc.

29. The system of claim 28, wherein said disc is glass.

30. The system of claim 17, wherein said observed distance between said slider and said disc is determined by optical interference techniques.

31. The system of claim 30, wherein said slider has one or more measurement scale markings upon a slider surface facing said disc, each of said markings associated to a respective actual distance from said disc.

32. The system of claim 31, wherein said comparison between said observed distance and said actual distance includes comparing the actual distance associated to a scale marking to an observed distance at that location.

* * * * *